(12) United States Patent
Hidaka et al.

(10) Patent No.: US 8,196,457 B2
(45) Date of Patent: Jun. 12, 2012

(54) SURFACE TEXTURE MEASURING DEVICE, SURFACE TEXTURE MEASURING METHOD AND SURFACE TEXTURE MEASURING PROGRAM

(75) Inventors: Hiroyuki Hidaka, Miyazaki-gun (JP); Tsukasa Kojima, Sapporo (JP)

(73) Assignee: Mitutoyo Corporation, Kawasaki (JP)

( * ) Notice: Subject to any disclaimer, the term of this patent is extended or adjusted under 35 U.S.C. 154(b) by 401 days.

(21) Appl. No.: 12/216,884

(22) Filed: Jul. 11, 2008

(65) Prior Publication Data

US 2009/0049893 A1 Feb. 26, 2009

(30) Foreign Application Priority Data

Jul. 18, 2007 (JP) .................. 2007-186904

(51) Int. Cl.
*G01B 5/28* (2006.01)
(52) U.S. Cl. ....................................................... 73/105
(58) Field of Classification Search ............... 73/105
See application file for complete search history.

(56) References Cited

U.S. PATENT DOCUMENTS 6,505,141 B2 * 1/2003 Smith et al. .................. 702/166
6,696,697 B2 * 2/2004 Enomoto ................. 250/559.22
7,146,850 B2 * 12/2006 McCrea ........................ 73/105

FOREIGN PATENT DOCUMENTS

| JP | A-10-103947 | 4/1998 |
|----|-------------|--------|
| JP | A-10-103948 | 4/1998 |
| JP | A-2000-227327 | 8/2000 |
| JP | A-2001-156326 | 6/2001 |
| JP | A-2001-336928 | 12/2001 |
| JP | A-2003-156326 | 5/2003 |

OTHER PUBLICATIONS

Chinese Office Action issued in Chinese Patent Application No. 200810168618.3 dated Aug. 4, 2010 (with translation).

* cited by examiner

*Primary Examiner* — Hezron E Williams
*Assistant Examiner* — Rodney T Frank
(74) *Attorney, Agent, or Firm* — Oliff & Berridge, PLC

(57) ABSTRACT

A surface texture measuring device comprises a display control unit operative to display a drawing symbol entry screen having entry areas of drawing symbols. An entry acceptance unit is provided to accept the input of the drawing symbol into the entry area provided in the drawing symbol entry screen. An arithmetic unit is provided to calculate surface texture information that indicates a surface texture of an object to be measured, from the measurement result of surface displacements of the object, based on the drawing symbol accepted at the entry acceptance unit.

18 Claims, 5 Drawing Sheets

51: Drawing Symbol Entry Screen

52: Setting Symbol Entry Screen

SURFACE TEXTURE MEASURING DEVICE, SURFACE TEXTURE MEASURING METHOD AND SURFACE TEXTURE MEASURING PROGRAM

CROSS-REFERENCE TO RELATED APPLICATION

This application is based upon and claims the benefit of priority from the prior Japanese Patent Application No. 2007-186904, filed on Jul. 18, 2007, the entire contents of which are incorporated herein by reference.

BACKGROUND OF THE INVENTION

1. Field of the Invention

The present invention relates to a surface texture measuring device, surface texture measuring method and surface texture measuring program for measuring the surface texture of a object to be measured.

2. Description of the Related Art

There have been known surface texture measuring devices for measuring the surface texture of an object to be measured. A surface texture measuring device is operative to obtain a displacement of the object (work) as a measurement result and calculates the surface texture from the measurement result. In measurement, and in calculation of the surface texture, it is required to establish parameters (setting symbols) inherent in the measuring machine. In a word, setting of the surface texture measuring device is complicated and difficult to use.

Surface texture measuring devices with easily settable measurement conditions disclosed in Patent Document 1 (JP 10-103947A) and Patent Document 2 (JP 10-103948A) can suppress an omission and an error in setting the measurement conditions. The surface texture measuring device described in Patent Document 1 displays a measurement condition selectable screen so that a user can sequentially designate measurement conditions on the screen to set setting symbols. Patent Document 2 discloses a surface texture measuring device, which receives the input of a certain measurement condition and specifies other non-input measurement conditions.

On the other hand, setting symbols can be established by the user based on drawing symbols in accordance with a certain standard (such as ISO 1302:2002). Drawing symbols comprise certain graphics, and symbols (numerics and characters) arranged at certain positions in the graphics. In the drawing symbols, the graphics and symbols represent various parameters such as the type of an evaluation curve, a checking method, the number of evaluation zones, a cut-off length, and the type of a filter. In a word, the user is required to sufficiently understand the relations among the drawing symbols and the setting symbols. Therefore, establishment of the setting symbols based on the drawing symbols may cause an entry error by the user and result in complicated setting of the surface texture measuring device.

Therefore, the present invention has an object to provide a surface texture measuring device, surface texture measuring method and surface texture measuring program with improved convenience and enhanced reliability.

SUMMARY OF THE INVENTION

The present invention provide a surface texture measuring device, comprising: a display control unit operative to display a drawing symbol entry screen having entry areas of drawing symbols; an entry acceptance unit operative to accept the input of the drawing symbol into the entry area provided in the drawing symbol entry screen; and an arithmetic unit operative to calculate surface texture information that indicates a surface texture of an object to be measured, from the measurement result of surface displacements of the object, based on the drawing symbol accepted at the entry acceptance unit.

With the above configuration, a user can directly enter a drawing symbol into the drawing symbol entry screen from drawing symbols, for example, described on the page. Therefore, the user is not required to sufficiently understand the relations among the drawing symbols and the entry-required parameters (setting symbols) inherent in the measuring machine.

The display control unit may display a setting symbol entry screen having entry areas of setting symbols corresponding to the drawing symbols. In this case, the surface texture measuring device may further comprise a converter operative to convert the drawing symbol fed to the entry area in the drawing symbol entry screen into the corresponding setting symbol; and a display format switcher operative to execute screen switch control for switching from the drawing symbol entry screen to the setting symbol entry screen. The entry acceptance unit may also accept the input of the setting symbol into the entry area provided in the setting symbol entry screen, and the arithmetic unit may also calculate surface texture information that indicates a surface texture of the object, from the measurement result, based on the drawing symbol corresponding to the setting symbol accepted at the entry acceptance unit. With such the configuration, the user may switch between the drawing symbol entry screen and the setting symbol entry screen to use either entry-accustomed one for entering, which can suppress entry errors.

The surface texture measuring device according to the present invention may further comprise an input condition decider operative to decide whether the input value that is the drawing symbol accepted at the entry acceptance unit matches a certain input condition; and a reporter operative to report the effect when the input value is decided not to match the input condition. With such the configuration, the user can recognize an entry error in the input value from the decision information and suppress entry errors.

The surface texture measuring device according to the present invention may further comprise a guide unit operative to explain the content of the drawing symbol. With such the configuration, the user can understand the content of the drawing symbol and suppress entry errors.

The display control unit may be configured to display the surface texture information together with the drawing symbol.

The present invention also provides a surface texture measuring method for use in surface texture measurement, comprising: displaying a drawing symbol entry screen having entry areas of drawing symbols; accepting an input of the drawing symbol into the entry area provided in the drawing symbol entry screen; and calculating surface texture information that indicates a surface texture of an object to be measured, from the measurement result of surface displacements of the object, based on the drawing symbol accepted.

The present invention further provides a surface texture measuring program, comprising computer-executable steps of: displaying a drawing symbol entry screen having entry areas of drawing symbols; accepting an input of the drawing symbol into the entry area provided in the drawing symbol entry screen; and calculating surface texture information that indicates a surface texture of an object to be measured, from the measurement result of surface displacements of the object, based on the drawing symbol accepted.

DETAILED DESCRIPTION OF THE EMBODIMENTS

The preferred embodiments of the present invention will now be described with reference to the accompanying drawings.

[Configuration of Surface Texture Measuring Device]

Figure 1:
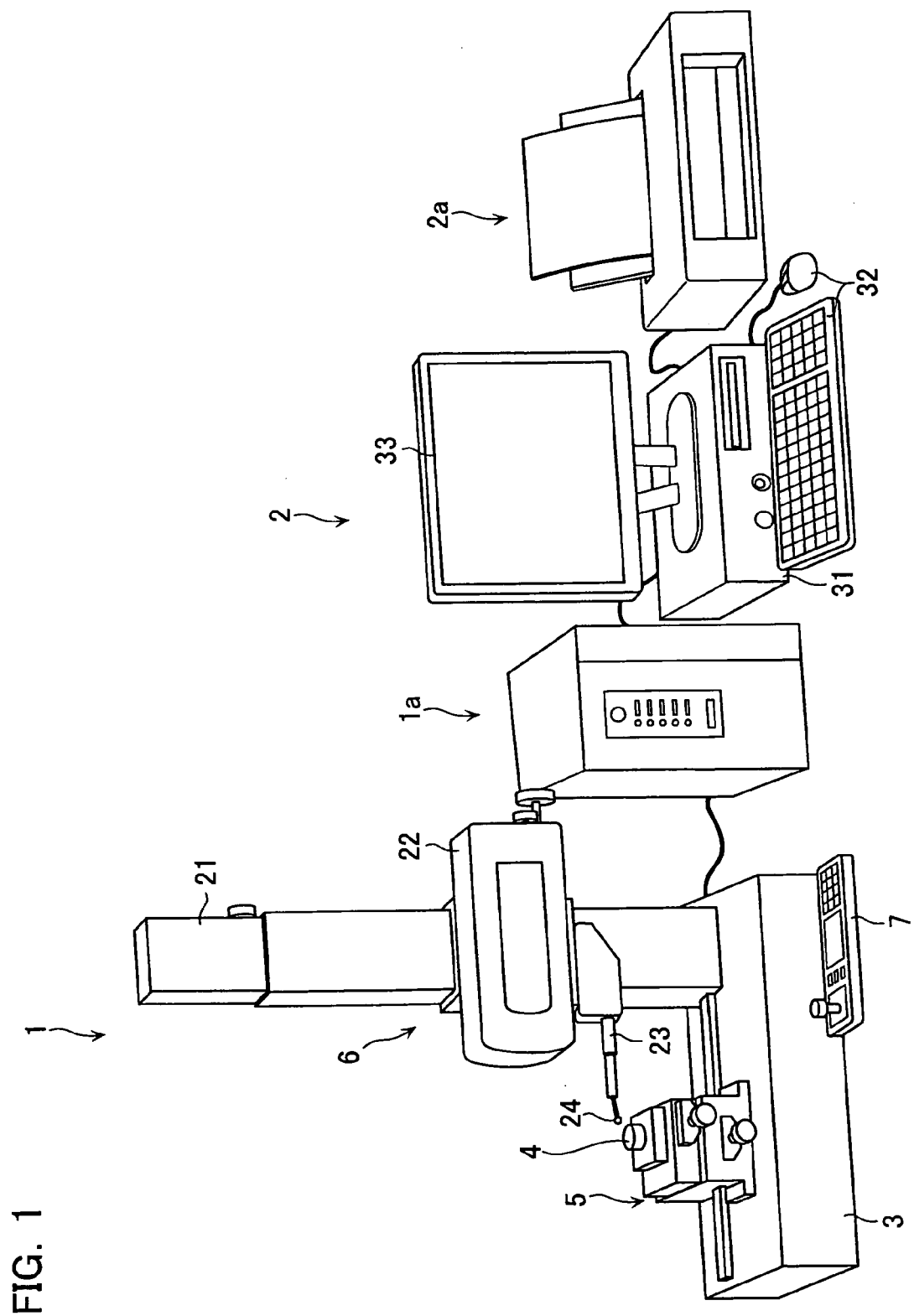
FIG. 1 is a perspective view showing a brief configuration of a surface texture measuring device according to one embodiment of the present invention.

Referring first to FIG. 1, a brief configuration of a surface texture measuring device according to one embodiment of the present invention is described. FIG. 1 is a perspective view showing the brief configuration of the surface texture measuring device according to one embodiment of the present invention. The surface texture measuring device comprises a measuring machine body (measuring unit) 1; a drive controller 1a for drive-controlling the measuring machine body 1 and receiving necessary measurement values from the measuring machine body 1; an arithmetic processor 2 having functions of, for example, calculating surface textures based on the measurement values received through the drive controller 1a; and a printer 2a operative to print out information received from the arithmetic processor 2. The measuring machine body 1 includes a base 3; a table 5 provided on the base 3 to receive a work 4 thereon; a displacement detector 6 operative to detect displacements of the surface of the work 4 mounted on the table 5; and an operating unit 7 for operating these devices.

The displacement detector 6 is configured as follows. Namely, a column 21 is provided to stand on the base 3 and extend upward. A slider 22 is mounted on the column 21 movable upward and downward. An arm 23 is mounted on the slider 22. The arm 23 is configured drivable in the horizontal direction and includes a probe 24 on the tip. By moving the slider 22 and the arm 23 and bringing the probe 24 into contact with the surface of the work 4, displacements on the work 4 surface can be obtained as measurement data.

The measurement data obtained at the displacement detector 6 is received at the arithmetic processor 2 through the drive controller 1a to derive the surface texture of the work 4 therefrom. The arithmetic processor 2 includes an arithmetic processor body 31 operative to execute arithmetic operation, an operating unit 32, and a display screen 33. The arithmetic processor 2 is configured capable of controlling the operation of the measuring machine body 1, like the operating unit 7.

Figure 2:
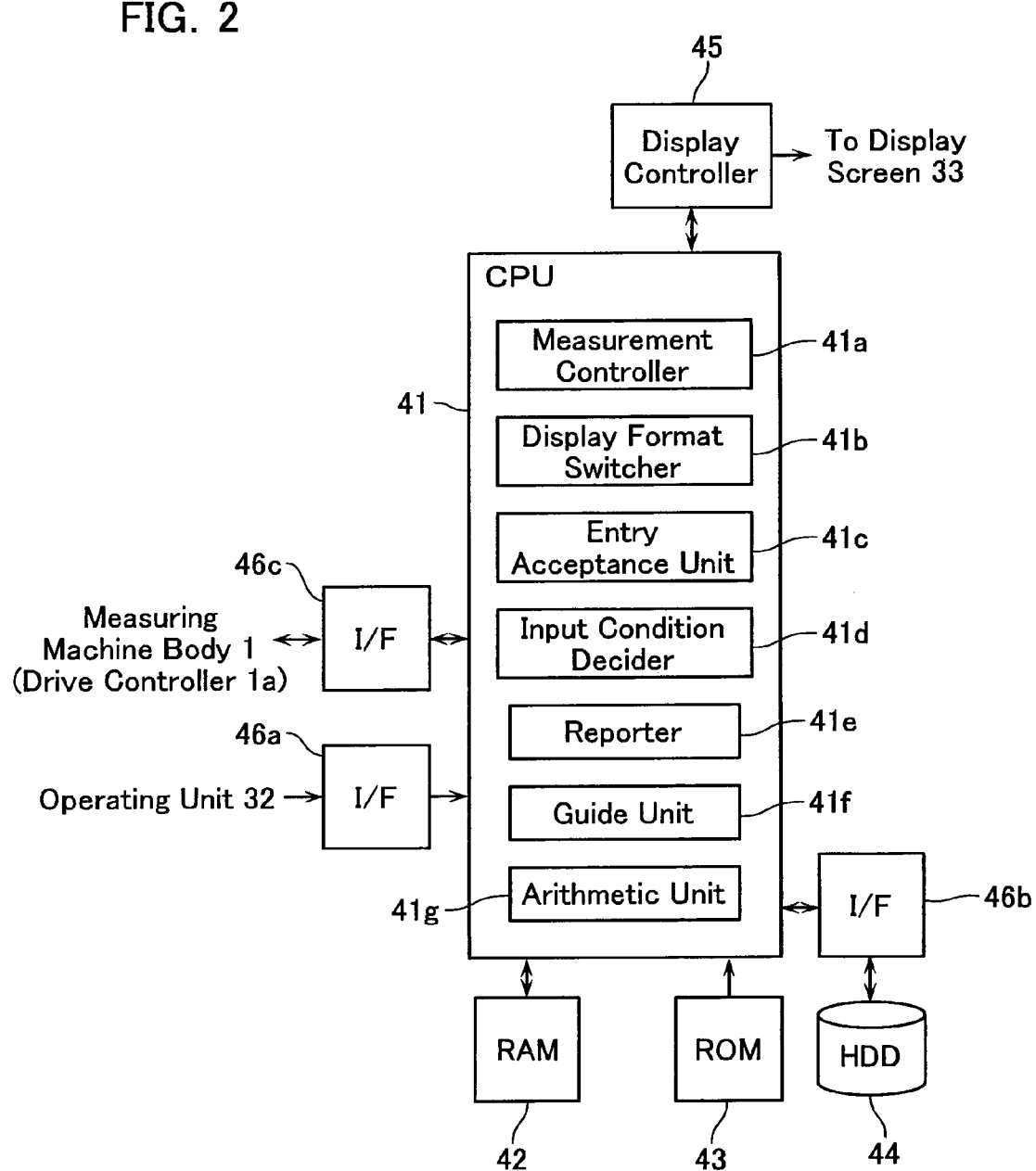
FIG. 2 is a block diagram showing a configuration of an arithmetic processor body 31 according to one embodiment of the present invention.

Referring next to FIG. 2, a configuration of the arithmetic processor body 31 is described. FIG. 2 is a block diagram showing the configuration of the arithmetic processor body 31 according to one embodiment of the present invention.

The arithmetic processor body 31 mainly includes a CPU 41, a RAM 42, a ROM 43, an HDD 44, and a display controller 45. In the arithmetic processor body 31, code information and position information entered from the operating unit 32 can be fed into the CPU 41 via an I/F 46a. The CPU 41 executes measurement execution processing and surface texture arithmetic operation in accordance with a macro program stored in the ROM 43 and various programs stored in the RAM 42 from the HDD 44 via an I/F 46b.

The CPU 41 uses an I/F 46c to control the measuring machine body 1 through the drive controller 1a in accordance with the measurement execution processing. The HDD 44 is a recording medium configured to store various control programs. The RAM 42 is used to store various programs and provide work areas for various processing. The CPU 41 provides the measurement results and so forth via the display controller 45 to the display screen 33, which displays them thereon. The display controller 45 has a function of displaying a symbol entry screen (a drawing symbol entry screen having entry areas of drawing symbols and/or a setting symbol entry screen having entry areas of setting symbols).

The CPU 41 reads various programs from the HDD 44 and executes the programs to serve as a measurement controller 41a, a display format switcher 41b, an entry acceptance unit 41c, an input condition decider 41d, a reporter 41e, a guide unit 41f, and an arithmetic unit 41g.

The measurement controller 41a controls the measuring machine body 1 based on the measurement condition accepted. The display format switcher 41b has a function of executing screen switch control for switching between the drawing symbol entry screen and the setting symbol entry screen having entry areas of setting symbols corresponding to drawing symbols. In accordance with the screen switch control executed by the display format switcher 41b when the drawing symbol entry screen is displayed, the above-described display controller 45 switches the display from the drawing symbol entry screen to the setting symbol entry screen in which the drawing symbols entered in the entry areas are converted into corresponding setting symbols. The entry acceptance unit 41c accepts the input to the entry area provided on the symbol entry screen of the input symbol (setting symbol or drawing symbol).

The input condition decider 41d decides whether the input value that is the input symbol accepted at the entry acceptance unit 41c matches a certain input condition. The reporter 41e reports the effect when the input value is decided not to match the input condition. The guide unit 41f displays a guide screen on the display screen 33 to explain the content of the drawing symbol.

The arithmetic unit 41g calculates surface texture information that indicates a surface texture of an object to be measured, from the measurement result of the surface displacement of the object, based on the drawing symbol accepted at the entry acceptance unit 41c.

[Drawing Symbol in Surface Texture Measurement]

Figure 3:
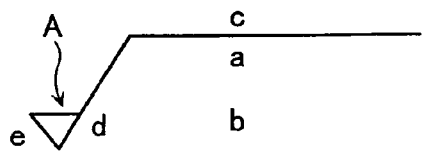
FIG. 3 shows a drawing symbol for use in surface texture measurement stipulated under a certain standard.
Figure 4:
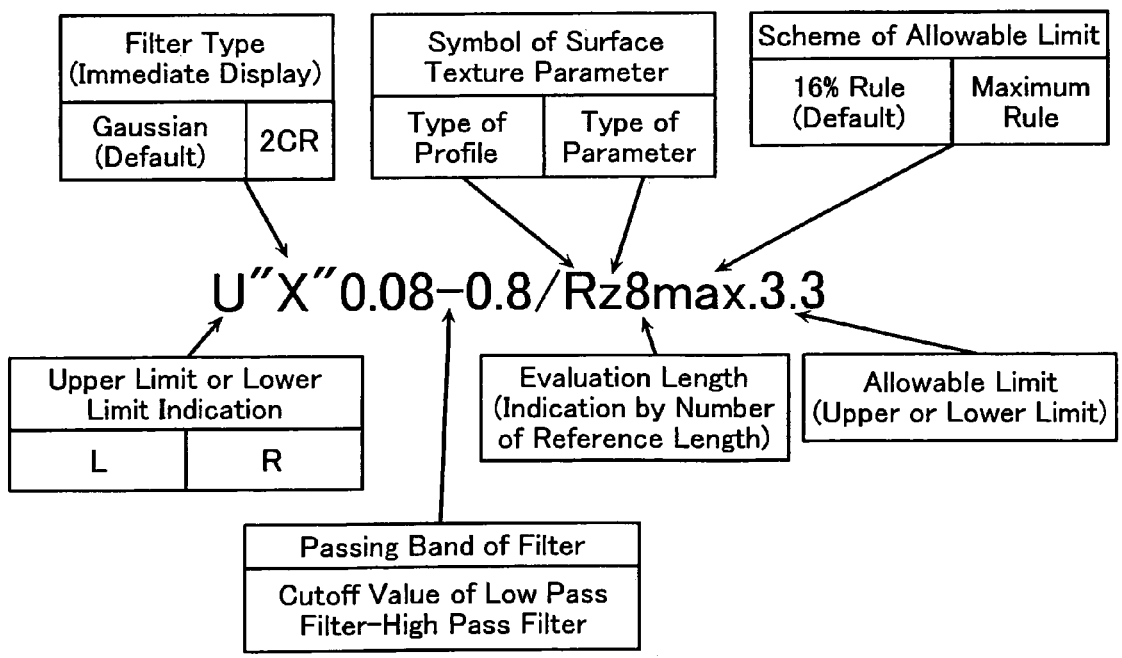
FIG. 4 shows a drawing symbol for use in surface texture measurement stipulated under a certain standard.

Referring next to FIGS. 3 and 4, drawing symbols stipulated under a certain standard for use in surface texture measurement are described. A drawing symbol in surface texture measurement can be represented in a format shown in FIG. 3. The marks a-e and the drawing symbol A in FIG. 3 mean respective pieces of information shown below.

Mark a: A passing band or reference length, a surface texture parameter symbol and a value thereof.

Mark b: An indication of parameters on and after the second when plural parameters are required.

Mark c: A processing method

Mark d: A fold and the direction thereof

Mark e: A shaving margin

Drawing Symbol A: The presence/absence of removal processing (the processing is present in the case of the drawing symbol A).

The following pieces of information are described in the location of the mark a in turn from the left side as shown in FIG. 4.

An indication of an upper or lower limit value
A filer type
A passing band of a filter (low pass filter-high pass filter)
A symbol of a surface texture parameter
An evaluation length (indicated by the number of the reference length)
A scheme of an allowable limit
An allowable limit value The surface texture measuring device according to the present embodiment accepts the input of drawing symbols associated with surface texture measurement made by the user with reference to the drawing symbols for use in surface texture measurement stipulated under the certain standard as described above.

[Surface Texture Arithmetic Operation in Surface Texture Measuring Device]

Figure 5:
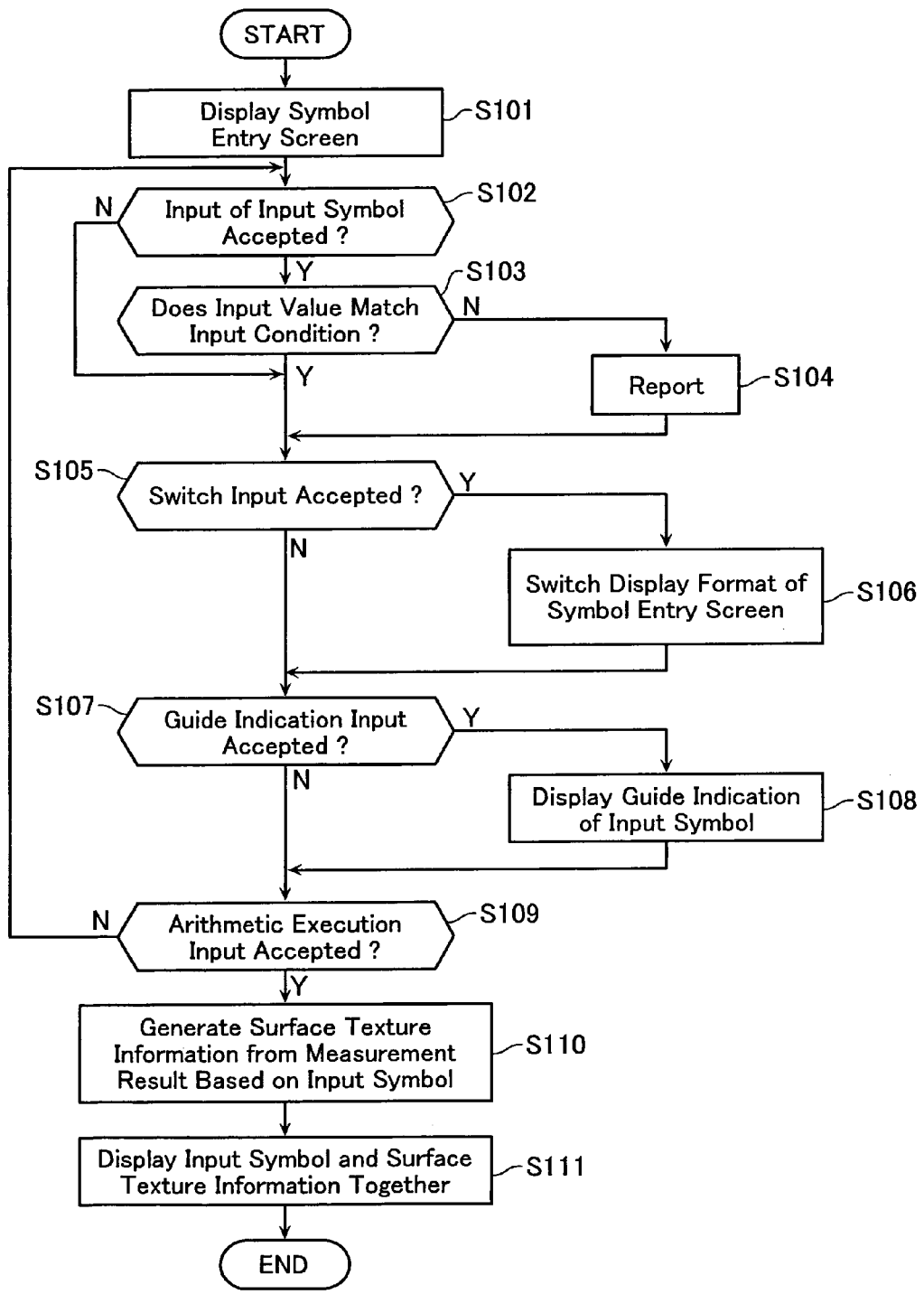
FIG. 5 is a flowchart showing a surface texture arithmetic operation in the surface texture measuring device according to one embodiment of the present invention.

Referring next to FIG. 5, a surface texture arithmetic operation in the surface texture measuring device is described. FIG. 5 is a flowchart showing the surface texture arithmetic operation in the surface texture measuring device. The surface texture arithmetic operation shown in FIG. 5 is to be executed after the measuring machine body 1 measures a surface displacement of the work 4 to obtain a measurement result. The surface texture arithmetic operation shown in FIG. 5 is realized through execution of the program based on the CPU 41.

As shown in FIG. 5, first, the display controller 45 displays a symbol entry screen on the display screen 33 (step S101). In this case, the display controller 45 displays either a drawing symbol entry screen 51 or a setting symbol entry screen 52, later described.

Subsequently, the entry acceptance unit 41c decides whether it accepts the input of an input symbol from the operating unit 32 (step S102). If the entry acceptance unit 41c decides that it accepts the input of the input symbol (step S102: Y), then the input condition decider 41d decides whether the input value matches a certain input condition (step S103). For example, the input condition decider 41d decides in step S103 whether the input value is entered in an accurate grammar.

If the input condition decider 41d decides in step S103 that the input value does not match the certain input condition (step S103: N), then the reporter 41 reports the effect (step S104). For example, the report in step S104 includes a notice such as a beep tone and a warning notice information displayed on the display screen 33.

If the entry acceptance unit 41c decides that it does not accept the input of any input symbol (step S102: N), and if the input condition decider 41d decides that the input value does matches the certain input condition (step S103: Y), then the entry acceptance unit 41c subsequently decides whether it accepts a switch input that instructs an execution of the screen switch control over the symbol entry screen (step S105). If the entry acceptance unit 41c decides that it accepts the switch input (step S105: Y), then the display format switcher 41b executes the screen switch control over the symbol entry screen (step S106). The screen switch control in step S106 is executed such that the drawing symbols correspond to the setting symbols before and after switching.

After the processing in step S106, or the entry acceptance unit 41c decides that it does not accept the switch input (step S105: N), then the entry acceptance unit 41c decides whether it accepts a guide indication input that instructs an explanation of the content of the input symbol (step S107). If the entry acceptance unit 41c decides that it accepts the guide indication input (step S107: Y), then the guide unit 41f displays a guide indication on the display screen 33 to explain the content of the input symbol (step S108).

After the processing in step S108, or the entry acceptance unit 41c decides that it does not accept the guide indication input (step S107: N), then the entry acceptance unit 41c subsequently decides whether it accepts an arithmetic execution input that instructs an arithmetic operation of surface texture information from the measurement result based on the input symbol (step S109). If the entry acceptance unit 41c decides that it does not accept the arithmetic execution input (step S109: N), then the processes in and after step S102 are repeatedly executed.

On the other hand, if the entry acceptance unit 41c decides in step S109 that it accepts the arithmetic execution input (step S109: Y), then the arithmetic unit 41g executes the arithmetic operation from the measurement result based on the input symbol to generate surface texture information (step S110). In addition, the display controller 45 displays the surface texture information together with the input symbol on the display screen 33 (step S111). Thus, surface texture arithmetic operation in the surface texture measuring device is finished.

[An Example of Symbol Entry Screen]

Figure 6A:
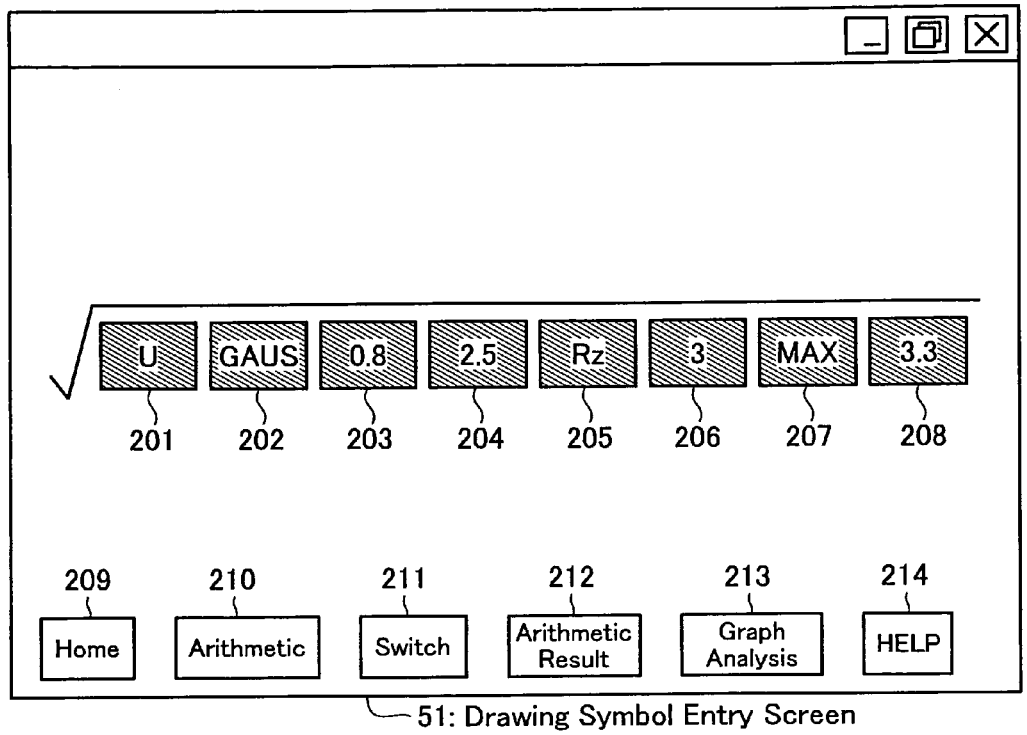
FIGS. 6A and 6B show an example of symbol entry screens (a drawing symbol entry screen 51 and a setting symbol entry screen 52) in the surface texture measuring device according to one embodiment of the present invention.
Figure 6B:
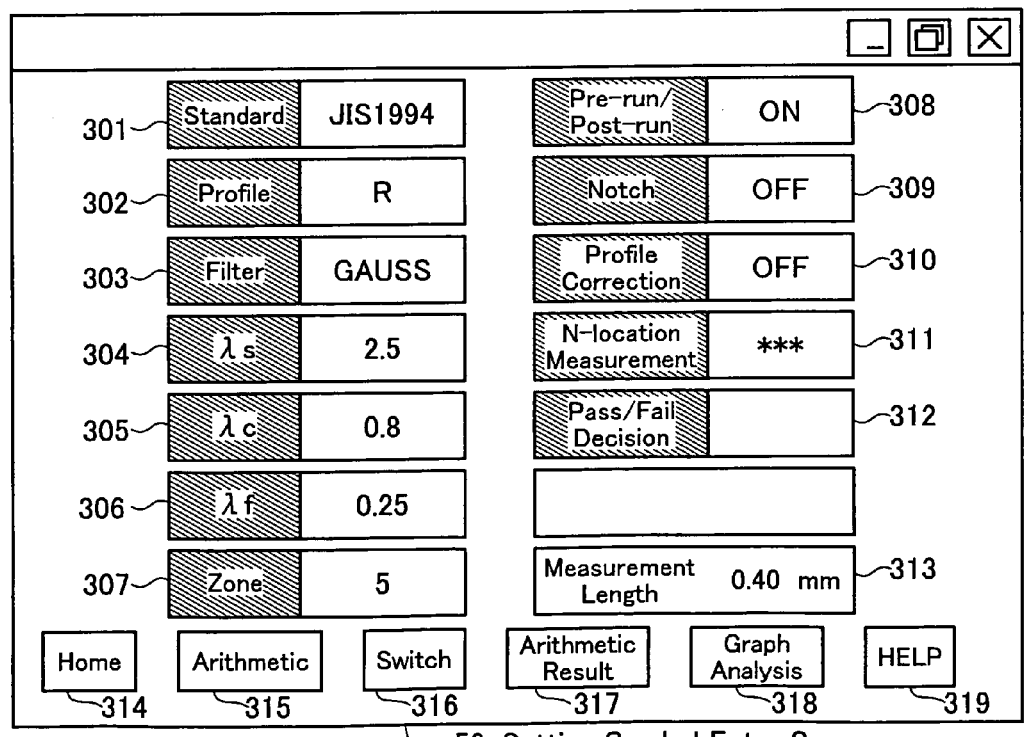

Referring next to FIGS. 6A and 6B, an example of the symbol entry screen is described. FIGS. 6A and 6B show an example of symbol entry screens. FIG. 6A shows the drawing symbol entry screen 51 for use in entering drawing symbols. FIG. 6B shows the setting symbol entry screen 52 for use in entering setting symbols. The drawing symbol entry screen 51 shown in FIG. 6A and the setting symbol entry screen 52 shown in FIG. 6B are configured mutually switchable by the above-described display format switcher 41b.

As shown in FIG. 6A, various entry boxes 201-208 (entry areas of drawing symbols) to accept the input of drawing symbols are displayed at the middle portion of the drawing symbol entry screen 51. In addition, various execution buttons 209-214 are provided in a lower portion of the drawing symbol entry screen 51.

The values in the various entry boxes 201-208 displayed in the setting symbol entry screen 52 correspond to various parameters of the drawing symbols shown in FIGS. 3 and 4.

The home button 209 is used, when it is pressed, to instruct displaying the symbol entry screen in a display format set home. The arithmetic button 210 is used, when it is pressed, to instruct calculating surface texture information from the measurement result based on the drawing symbol. The switch button 211 is used, when it is pressed, to instruct the display format switcher 41b to execute screen switch control for switching from the drawing symbol entry screen 51 to the setting symbol entry screen 52. The arithmetic result button 212 is used, when it is pressed, to instruct displaying the surface texture information calculated at the arithmetic unit 41g together with the drawing symbol. The graph analysis button 213 is used, when it is pressed, to instruct graphing the surface texture information. The HELP button 214 is used, when it is pressed, to instruct the guide unit 41f to easily explain the contents of the drawing symbols entered in the various entry boxes 201-208 by document or table.

As shown in FIG. 6B, various entry boxes 301-313 (entry areas of setting symbols) to accept the input of setting symbols are displayed at the middle portion of the setting symbol entry screen 52. In addition, various execution buttons 314-319 are provided in a lower portion of the setting symbol entry screen 52.

The standard entry box 301 is used to accept the input of a standard (such as JIS 1994) for use in screen switch control corresponding to the drawing symbol entry screen 51. The profile entry box 302 is used to accept the input of the type of a total profile (such as R). For example, the higher-level standard entry box 301 restrains the lower-level input acceptance of setting symbols at a filter entry box 303 and so forth later-described. The filter entry box 303 is used to accept the type of a profile filter (such as GAUSS). Wavelength ($\lambda$s, $\lambda$c, $\lambda$f) entry boxes 304-306 are used to accept the input of wavelengths for use in filters. The zone entry box 307 is used to accept the input of a zone for filtering over measurement points (for example, 5). The pre-run/post-run entry box 308 is used to accept the input associated with speed control between measurement points if it is executed or not. The notch entry box 309 is used to accept the input associated with a notch of a work if it is designated or not. The profile correction entry box 310 is used to accept the input associated with correction of the profile if it is executed or not. The N-location measurement entry box 311 is used to accept the input of the number of measurement locations. The pass/fail decision entry box 312 is used to accept the input associated with a pass/fail decision on the arithmetic result if it is executed or not. The measurement length entry box 313 is used to accept the input of a measurement length.

The various execution buttons 314, 317-319 on the setting symbol entry screen 52 are used to cause executions of almost similar operations as the various execution buttons 209, 212-214 on the drawing symbol entry screen 51. The switch button 216 on the setting symbol entry screen 52 is used, when it is pressed, to instruct the display format switcher 41b to execute screen switch control for switching from the setting symbol entry screen 52 to the drawing symbol entry screen 51. The arithmetic button 315 is used, when it is pressed, to instruct calculating surface texture information from the measurement result based on the drawing symbol corresponding to the setting symbol.

As described above, in one embodiment according to the present invention, the display control unit 45 displays the drawing symbol entry screen 51 on the display screen 33. The entry acceptance unit 41c accepts the input of drawing symbols into the entry boxes 201-208 in the drawing symbol entry screen 51. The arithmetic unit 41g calculates surface texture information from the measurement result based on the drawing symbol accepted. Therefore, a user can directly enter a drawing symbol into the drawing symbol entry screen 51 with reference to the drawing symbols described on the page. Therefore, the user is not required to sufficiently understand the relations among the drawing symbols and the entry-required parameters (setting symbols) inherent in the measuring machine. In a word, the surface texture measuring device according to the present embodiment is provided with improved convenience and enhanced reliability.

In addition, in one embodiment according to the present invention, the display format switcher 41b can mutually switch between the setting symbol entry screen 52 and the drawing symbol entry screen 51. Therefore, the user can switch the screen to either entry-accustomed one for entering, which can suppress entry errors.

The input condition decider 41d and the reporter 41e report the effect when the input value is decided not to match the input condition. Therefore, the user may recognize an entry error and suppress the entry error. The guide unit 41f explains the content of the input symbol. Therefore, the user can understand the content of the input symbol (especially the drawing symbol) and suppress entry errors.

The embodiments of the present invention have been described above though the present invention is not limited to the above embodiments. For example, the various execution buttons 201-208 and 301-313 shown in FIGS. 6A and 6B are not required to directly enter values. In place of the various execution buttons 201-208 and 301-313, a pull-down menu configured to accept a selection among input symbols may be provided.

What is claimed is:

1. A surface texture measuring device, comprising:
    a display control unit operative to display a drawing symbol entry screen having entry areas of drawing symbols and including (a) graphics and (b) numerics and characters, the drawing symbols corresponding to various parameters stipulated by a standard for use in surface texture measurement, the entry areas into which the numerics and characters are entered being arranged at predetermined positions in the graphics in a manner stipulated by the standard;
    an entry acceptance unit operative to accept the input of the drawing symbol into the entry area provided in the drawing symbol entry screen; and
    an arithmetic unit operative to calculate surface texture information that indicates a surface texture of an object to be measured, from the measurement result of surface displacements of the object, based on the drawing symbol accepted at the entry acceptance unit.

2. The surface texture measuring device according to claim 1, wherein the display control unit is also operative to display a setting symbol entry screen differing from the drawing symbols entry screen and having entry areas of setting symbols corresponding to the drawing symbols for entering parameters inherent in the measuring device, further comprising:
    a converter operative to convert the drawing symbol fed to the entry area in the drawing symbol entry screen into the corresponding setting symbol; and
    a display format switcher operative to execute screen switch control for switching from the drawing symbol entry screen to the setting symbol entry screen.

3. The surface texture measuring device according to claim 2, wherein the entry acceptance unit is also operative to accept the input of the setting symbol into the entry area provided in the setting symbol entry screen,
    wherein the arithmetic unit is also operative to calculate surface texture information that indicates the surface texture of the object, from the measurement result, based on the drawing symbol corresponding to the setting symbol accepted at the entry acceptance unit.

4. The surface texture measuring device according to claim 1, further comprising:
    an input condition decider operative to decide whether the input value that is the drawing symbol accepted at the entry acceptance unit matches a certain input condition; and
    a reporter operative to report the effect when the input value is decided not to match the input condition.

5. The surface texture measuring device according to claim 1, further comprising a guide unit operative to explain the content of the drawing symbol.

6. The surface texture measuring device according to claim 1, wherein the display control unit is further operative to display the surface texture information together with the drawing symbol.

7. A surface texture measuring method for use in surface texture measurement, comprising:
- displaying a drawing symbol entry screen having entry areas of drawing symbols and including (a) graphics and (b) numerics and characters, the drawing symbols corresponding to various parameters stipulated by a standard for use in surface texture measurement, the entry areas into which the numerics and characters are entered being arranged at predetermined positions in the graphics in a manner stipulated by the standard;
- accepting an input of the drawing symbol into the entry area provided in the drawing symbol entry screen; and
- calculating surface texture information that indicates the surface texture of an object to be measured, from the measurement result of surface displacements of the object, based on the drawing symbol accepted.

8. The surface texture measuring method according to claim 7, further comprising:
- displaying a setting symbol entry screen differing from the drawing symbols entry screen and having entry areas of setting symbols corresponding to the drawing symbols;
- converting the drawing symbol fed to the entry area in the drawing symbol entry screen into the corresponding setting symbol for entering parameters inherent in the measuring device; and
- executing screen switch control for switching from the drawing symbol entry screen to the setting symbol entry screen.

9. The surface texture measuring method according to claim 8, further comprising:
- accepting the input of the setting symbol into the entry area provided in the setting symbol entry screen; and
- calculating surface texture information that indicates the surface texture of the object, from the measurement result, based on the drawing symbol corresponding to the accepted setting symbol.

10. The surface texture measuring method according to claim 7, further comprising:
- deciding whether the input value that is the drawing symbol accepted matches a certain input condition; and
- reporting the effect when the input value is decided not to match the input condition.

11. The surface texture measuring method according to claim 7, further comprising explaining the content of the drawing symbol.

12. The surface texture measuring method according to claim 7, further comprising displaying the surface texture information together with the drawing symbol.

13. A non-transient computer-readable storage medium for storing a surface texture measuring program, the program comprising computer-executable steps of:
- displaying a drawing symbol entry screen having entry areas of drawing symbols and including (a) graphics and (b) numerics and characters, the drawing symbols corresponding to various parameters stipulated by a standard for use in surface texture measurement, the entry areas into which the numerics and characters are entered being arranged at predetermined positions in the graphics in a manner stipulated by the standard;
- accepting an input of the drawing symbol into the entry area provided in the drawing symbol entry screen; and
- calculating surface texture information that indicates the surface texture of an object to be measured, from the measurement result of surface displacements of the object, based on the drawing symbol accepted.

14. The storage medium for storing the surface texture measuring program according to claim 13, the program further comprising computer-executable steps of:
- displaying a setting symbol entry screen differing from the drawing symbols entry screen and having entry areas of setting symbols corresponding to the drawing symbols for entering parameters inherent in the measuring device;
- converting the drawing symbol fed to the entry area in the drawing symbol entry screen into the corresponding setting symbol; and
- executing screen switch control for switching from the drawing symbol entry screen to the setting symbol entry screen.

15. The storage medium for storing the surface texture measuring program according to claim 14, the program further comprising computer-executable steps of:
- accepting the input of the setting symbol into the entry area provided in the setting symbol entry screen; and
- calculating surface texture information that indicates the surface texture of the object, from the measurement result, based on the drawing symbol corresponding to the accepted setting symbol.

16. The storage medium for storing the surface texture measuring program according to claim 13, the program further comprising computer-executable steps of:
- deciding whether the input value that is the drawing symbol accepted matches a certain input condition; and
- reporting the effect when the input value is decided not to match the input condition.

17. The storage medium for storing the surface texture measuring program according to claim 13, the program further comprising a computer-executable step of explaining the content of the drawing symbol.

18. The storage medium for storing the surface texture measuring program according to claim 13, the program further comprising a computer-executable step of displaying the surface texture information together with the drawing symbol.

* * * * *